Patented Dec. 23, 1952

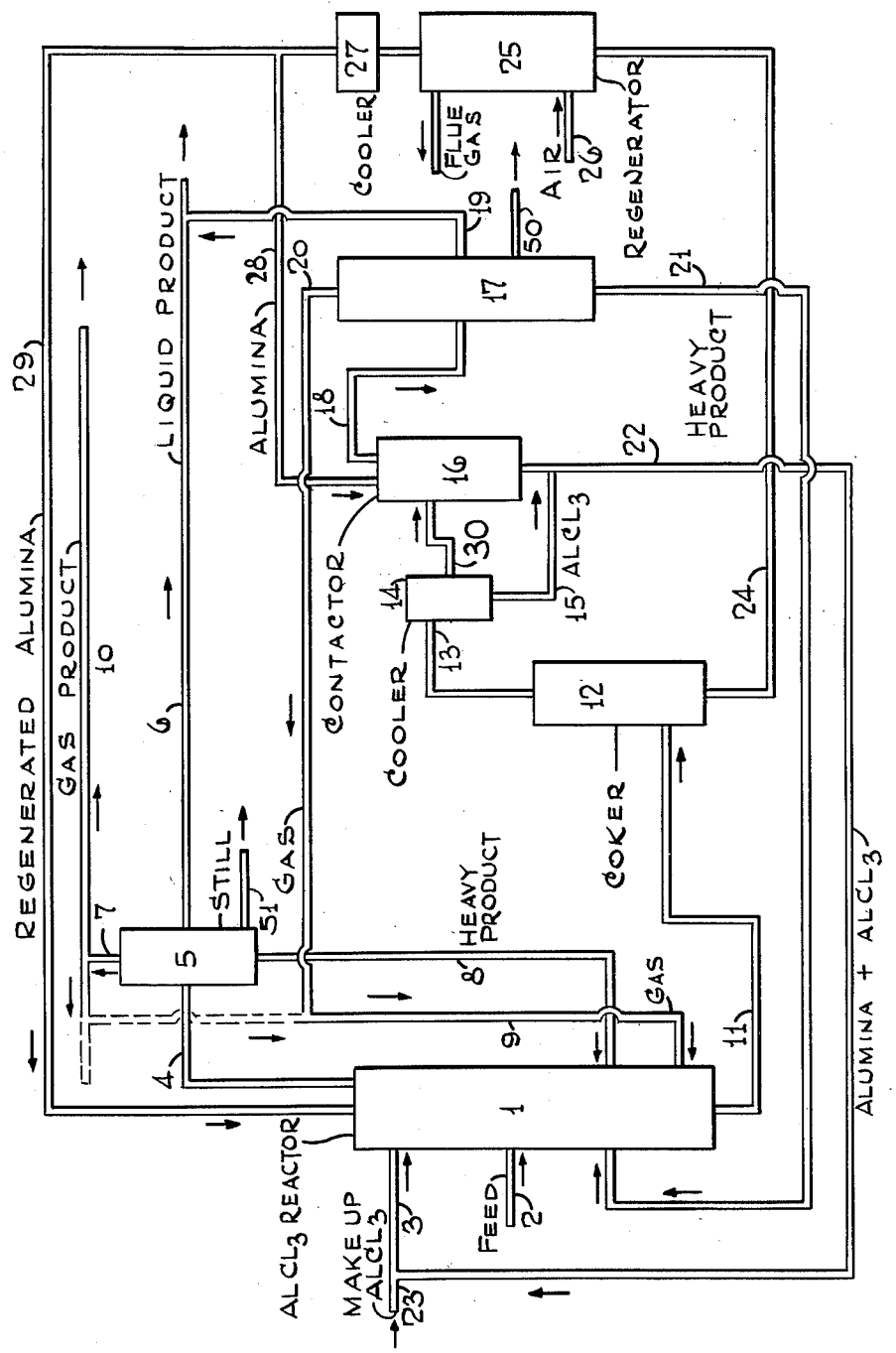

2,623,009

UNITED STATES PATENT OFFICE 2,623,009

REGENERATIVE ALUMINUM CHLORIDE PROCESS

Kenneth K. Kearby, Cranford, N. J., assignor to Standard Oil Development Company, a corporation of Delaware Application October 27, 1950, Serial No. 192,415

2 Claims. (Cl. 196—49)

The present invention is concerned with an improved process for the refining of hydrocarbon oils utilizing aluminum chloride as a refining agent. The invention is more particularly concerned with a process for the handling of the aluminum chloride reagent in a manner so as to prevent excessive loss of the same and also to prevent excessive losses of the material being treated. In accordance with one specific concept of the present invention aluminum chloride is utilized in conjunction with a solid support which support is utilized to adsorb aluminum chloride from the effluent hydrocarbon product streams.

It is well known in the art to utilize aluminum chloride as a refining agent, particularly for the processing of hydrocarbon oils. Aluminum chloride is one of the most active and versatile of catalysts for conducting petroleum reactions. However at the present time, in the refining of petroleum oils, its use is largely confined to isomerization and alkylation reactions and no satisfactory naphtha reforming process based on the use of this catalyst has been discovered. This is due to the excessive catalyst consumption and sludge formation which is incurred. Thus, aluminum chloride is not being used extensively for the refining of naphthas or for the cracking of oils at elevated temperatures because of its tendency to form large amounts of sludge and consume excessive amounts of aluminum chloride.

In accordance with the present invention, it is possible to utilize aluminum chloride at conditions not previously considered feasible, as for example in operations to refine or improve the octane number quality of naphthas; or for cracking, polymerization or alkylation reactions or to carry out other useful conversions of petroleum products. The gas formed and heavy products are recycled in the process in such a manner that minimum quantities of these products are obtained. The aluminum chloride is recovered and reused so that a minimum amount of aluminum chloride is required as make-up catalyst. The aluminum chloride-hydrocarbon complexes are converted to useful hydrocarbons. The aluminum chloride and coked support is regenerated by burning with air and used to re-absorb the aluminum chloride from the product gases. The support may comprise activated alumina, activated bauxite, and the like. Although the preferred supports are alumina and silica gel and the present invention to utilize mixed silica-equivalent materials it is within the scope of alumina gels or other adsorbents.

The process of the present invention may be more fully understood by reference to the drawing illustrating one embodiment of the same. Referring specifically to the drawing, a hydrocarbon feed stream to be processed by contact with aluminum chloride is introduced into the aluminum chloride reactor 1 by means of feed line 2. The hydrocarbon feed stream flows upwardly in reactor 1 and countercurrently contacts a downflowing stream of aluminum chloride catalyst which is introduced into reactor 1 at the upper section thereof by means of line 3. The temperatures and pressures maintained in reactor 1 may be varied appreciably depending upon the particular type of operation being carried out. Pressures may vary in the range from atmospheric to 1500 lbs. per sq. in., while temperatures may range from about 200 to 900° F. These conditions, however, will vary depending upon recycle rates, and upon the concentration of aluminum chloride employed.

The hydrocarbon stream undergoing various rearrangement reactions, as for example, cracking, isomerization and the like, is removed from the top of reaction zone 1 by means of line 4 and passed to a distillation zone 5 wherein the desired boiling point fractions are segregated. The hydrocarbon product stream is fractionated in zone 5 to secure a fraction boiling in the motor fuel boiling range, which is removed by means of line 6. Hydrocarbon fractions boiling below the motor fuel boiling range are removed overhead by means of line 7. Higher boiling constituents are removed as a bottom fraction by means of line 8 and at least a portion of the same preferably recycled into the lower section of the reactor 1. Part of the gas stream removed overhead by means of line 7 may be recycled to the bottom of the reactor by means of line 9, while the remaining gases are removed from the system and handled as desired by means of line 10.

In accordance with the present process the catalyst and residual fractions are removed from the bottom of zone 1 by means of line 11 and are passed to a coking zone 12. Prior to withdrawal the used catalyst along with the sludge produced are stripped in the lower section of the reactor 1. The stripping gases are preferably segregated in zones 17 and 5 and contain from about 2 to 4 carbon atoms in the molecule. This gas stream carries the lower boiling hydrocarbons upwardly in the reactor and allows only the sludge and used catalyst to pass downwardly and be withdrawn from the bottom of the reactor by means of line 11. The sludge and catalyst introduced into coking zone 12 are preferably maintained at a temperature in the range from about 800 to 1100° F. Under these conditions most of the aluminum chloride and hydrocarbons are removed overhead by means of line 13. This stream is cooled in cooling zone 14 causing the formation of a liquid aluminum chloride phase and a liquid hydrocarbon phase. The aluminum chloride phase is withdrawn from the bottom of the cooler by means of line 15 and is preferably combined with a catalyst stream withdrawn from the bottom of a contacting zone 16. The liquid hydrocarbon product from the coking zone is introduced into zone 16 by means of line 30 and is contacted with regenerated alumina in order to remove dissolved aluminum chloride. This liquid hydrocarbon stream is then passed to distillation zone 17 by means of line 18 wherein the same is fractionated.

A liquid hydrocarbon fraction boiling in the motor fuel boiling range is removed by means of line 19, and handled as a liquid product. The gaseous constituents are removed overhead by means of line 20 and preferably recycled to aluminum chloride reactor 1. The heavy product is withdrawn from the bottom of zone 17 by means of line 21 and introduced also into aluminum chloride reactor 1. It is to be understood that streams other than gasoline, as for example, kerosene and gas oil, may be segregated in zones 5 and (kk) 17. Under these conditions this intermediate boiling stream may be withdrawn by means of lines 50 and 51 (kk) and handled as desired. The regenerated alumina removed from the bottom of zone 16 by means of line 22 is reintroduced into the top of reactor 1. Make-up aluminum chloride may be added by means of line 23. The alumina removed from the bottom of coking zone 12 by means of line 24 is introduced into regeneration zone 25 wherein the same is treated with air or oxygen or other oxygen-containing gas introduced by means of line 26 in a manner to regenerate the same. The temperatures employed are generally in the range from about 900 to 1200° F. The alumina is removed and passed through a cooling zone 27 and a portion recycled to the top of contacting zone 16 by means of line 28. The remaining regenerated alumina is introduced into the top of zone 1 by means of line 29 and is used to absorb from the product gases the aluminum chloride present.

The present invention is concerned with a novel procedure for regenerating and recovering aluminum chloride when the aluminum chloride is used in the refining of oils, particularly in the refining of petroleum oils.

As pointed out, the conditions in the aluminum chloride reaction zone will vary appreciably depending upon the type of reaction being carried out. For example, in a naphtha reforming operation preferred temperatures are in the range from 400 to 700° F. and preferably pressures are in the range from about 200 to 1000 lbs. per sq. in. gauge. Recirculation of hydrogen may be employed as an effective means for reducing the net carbon production in this zone. It is also within the scope of the present invention to recycle hydrogen chloride. Added HCl gas in the proportions of 0.1 to 10 mols/mol of hydrocarbon modifies the activity of the aluminum chloride catalyst and can be used to maximize the selectivity for reactions producing gasoline type hydrocarbons. Hydrogen is effective in lowering yields of sludge and coke and in maintaining a higher activity level. It is preferably used in ratios of 0.5 to 10 mols per mol of hydrocarbon.

It is to be understood that the process as described may be employed for the cracking of oils, as well as, for reforming naphthas. It is to be further understood that the operation may be one wherein a fluidized bed of solids is utilized. Also, it is to be understood that the reactor, the regenerator and other contacting vessels may comprise baffles, perforated or bubble plates or other suitable packing material. Furthermore, the vessels may be of the moving bed type utilizing pills, granular lumps or spheres of catalyst with suitable internal structures as required.

The invention is broadly concerned with an improved method for utilizing aluminum chloride as a catalyst in various reactions. The carrier, such as alumina, is used to preferably countercurrently contact the effluent product streams containing aluminum chloride in a manner to absorb the same. In accordance with a specific adaptation of the invention the effluent gases containing aluminum chloride are contacted with alumina in order to remove the aluminum chloride from the effluent gases. A particularly desirable method of operating in accordance with the present invention is to segregate the heavy products along with the aluminum chloride supported catalyst from the bottom of the reaction zone. This stream is then passed to a coker or equivalent zone wherein the heavy products together with the aluminum chloride are removed from the alumina. The alumina is then regenerated and employed to contact this latter gas stream in order to absorb the aluminum chloride on the regenerated alumina. This is very desirous since the aluminum chloride is removed from the alumina in the absence of water followed by burning the sludge from the alumina which contains hydrogen with air resulting in the production of moisture. If the moisture be present with the aluminum chloride the catalyst would be lost.

If the present invention be employed for the polymerization of olefins, a conventional feed comprising olefins having from 2 to 4 carbon atoms in the molecule is utilized. The concentration of the aluminum chloride on the alumina would be in the range from .5 to 10% by weight, preferably a concentration in the range from about 1 to 4% by weight. The feed stream may comprise olefins present in a concentration in the range from about 10 to 80% by volume. Pressures utilized would be in the range from atmospheric to 1000 lbs. per sq. in., while temperatures would be in the range from 300 to 800° F., preferably about 500° F. If the reaction comprises a reforming operation the feed stream would be a naphtha fraction boiling in the range from about 200 to 300° F. The concentration of the aluminum chloride on the alumina would be in the range from about 2% to 20% by weight, preferably in the range from about 7 to 12% by weight. Temperatures in the reaction zone would be in the range from about 300 to 900° F., preferably in the range from about 500 to 700° F. Pressures would vary from atmospheric to 1000 lbs., preferably below 100 lbs. per sq. in. gauge. If the cracking operation would comprise a gas oil feed temperatures would be adjusted accordingly.

Having described the invention it is claimed:

1. Process for the treatment of petroleum hydrocarbons with aluminum chloride which comprises introducing a feed stream at an intermediate point in a reaction zone, introducing aluminum chloride of sufficient strength to catalyze the reaction supported on a solid carrier at a point intermediate the top and at the point of introduction of the feed oil in the reaction zone and countercurrently contacting the same under temperature and pressure conditions adapted to secure the desired conversion of the feed stream, introducing a solid carrier free of aluminum chloride at the top of said reaction zone whereby said carrier countercurrently contacts product gases and removes aluminum chloride from said product gases, withdrawing product gases overhead from the top of said reaction zone and passing the same to a distillation zone wherein a liquid product is segregated and a gaseous product segregated, as well as, a heavy product, recycling said heavy product to said reaction zone at a point intermediate the point of introduction of said feed oil and the bottom of said reaction zone withdrawing an aluminum chloride-hydrocarbon sludge and carrier from the bottom of said reaction zone and passing the same to a coking zone, removing overhead from said coking zone vaporous aluminum chloride and hydrocarbons, condensing the same whereby an aluminum chloride phase and a hydrocarbon phase form, introducing the hydrocarbon phase into a contacting zone wherein the same contacts a solid carrier, whereby aluminum chloride is removed from said hydrocarbon phase, withdrawing the solid carrier from said contacting zone and combining it with said liquid aluminum chloride and passing the same to said point intermediate the top of said reaction zone and the point of introduction of the feed oil.

2. Process for the treatment of petroleum hydrocarbons with aluminum chloride which comprises introducing a feed stream at an intermediate point in a reaction zone, introducing aluminum chloride of sufficient strength to catalyze the reaction supported on a solid carrier at a point intermediate the top and at the point of introduction of the feed oil in the reaction zone and countercurrently contacting the same under temperature and pressure conditions adapted to secure the desired conversion of the feed stream, introducing a solid carrier free of aluminum chloride at the top of said reaction zone whereby said carrier countercurrently contacts product gases and removes aluminum chloride from said product gases, withdrawing product gases overhead from the top of said reaction zone and passing the same to a distillation zone wherein a liquid product is segregated and a gaseous product segregated, as well as, a heavy product, recycling said heavy product to said reaction zone at a point intermediate the point of introduction of said feed oil and the bottom of said reaction zone, withdrawing an aluminum chloride hydrocarbon sludge and carrier from the bottom of said reaction zone and passing the same to a coking zone, removing overhead from said coking zone vaporous aluminum chloride and hydrocarbons, condensing the same whereby an aluminum chloride phase and a hydrocarbon phase form, introducing the hydrocarbon phase into a contacting zone wherein the same contacts a solid carrier, whereby aluminum chloride is removed from said hydrocarbon phase, withdrawing the solid carrier from said contacting zone and combining it with said liquid aluminum chloride and passing the same to said point intermediate the top of said reaction zone and the point of introduction of the feed oil, withdrawing a solid carrier from the bottom of said coking zone and treating the same in a manner to regenerate the carrier.

KENNETH K. KEARBY.

REFERENCES CITED

The following references are of record in the file of this patent:

UNITED STATES PATENTS

| Number | Name | Date |
|---|---|---|
| 2,160,874 | Kinsel | June 6, 1939 |
| 2,319,199 | Benedict | May 18, 1943 |
| 2,355,446 | Komarewsky et al. | Aug. 8, 1944 |
| 2,388,932 | Ogorzaly | Nov. 13, 1945 |
| 2,404,649 | Neuhaus | July 23, 1946 |